United States Patent [19]
Hobbs, II

[11] Patent Number: 5,607,217
[45] Date of Patent: Mar. 4, 1997

[54] ILLUMINATION SYSTEM

[76] Inventor: James C. Hobbs, II, 4384 Ingraham Hwy., Miami, Fla. 33133

[21] Appl. No.: 353,705

[22] Filed: Dec. 12, 1994

Related U.S. Application Data

[63] Continuation-in-part of Ser. No. 143,172, Oct. 26, 1993, abandoned.

[51] Int. Cl.$^6$ .................................................. F21V 21/30
[52] U.S. Cl. ............................ 362/35; 362/286; 362/287; 362/401
[58] Field of Search ............................ 362/35, 401, 237, 362/240, 276, 802, 231, 230, 286, 287; 340/471, 472, 473, 490

[56] References Cited

U.S. PATENT DOCUMENTS

| | | |
|---|---|---|
| 2,345,382 | 3/1944 | Cramer . |
| 2,354,665 | 8/1944 | Church et al. . |
| 3,013,145 | 12/1961 | Trippe . |
| 3,049,615 | 8/1962 | Sawyer . |
| 3,117,302 | 1/1964 | Cardarelli et al. .................... 362/35 X |
| 3,732,537 | 5/1973 | Freeman ............................. 362/83.3 X |
| 3,784,809 | 1/1974 | Smith ........................................ 362/35 |
| 4,054,791 | 10/1977 | Du Shane ................................. 362/35 |
| 4,153,926 | 5/1979 | Hurt ........................................ 362/35 |
| 4,353,110 | 10/1982 | Ellis ........................................ 362/35 |
| 4,384,847 | 5/1983 | Schirneker ............................... 362/35 |
| 4,797,657 | 1/1989 | Vorzimmer et al. .................... 340/541 |
| 4,864,278 | 9/1989 | Wiley ...................................... 340/555 |
| 4,972,305 | 11/1990 | Blackburn .............................. 362/234 |
| 5,003,444 | 3/1991 | Secka et al. .......................... 362/35 X |
| 5,016,144 | 5/1991 | Di Maggio . |
| 5,041,947 | 8/1991 | Yuen et al. ............................... 362/35 |
| 5,175,528 | 12/1992 | Choi et al. ............................. 340/331 |
| 5,381,323 | 1/1995 | Osteen et al. .......................... 362/276 |

FOREIGN PATENT DOCUMENTS 2162352  1/1986  United Kingdom .

OTHER PUBLICATIONS

Adler's "Physiology of the Eye," Robert a. Moses, M.D., published in 1970 by the C. V. Mosby Company. p. 366.
Excerpts from retina entitled "Light–Induced Retinal Degeneration Rat", R. L. Peiffer Jr. & Dean P. Porter, pp. 83–87, date unknown.

Primary Examiner—Ira S. Lazarus
Assistant Examiner—Thomas M. Sember
Attorney, Agent, or Firm—Watts, Hoffmann, Fisher & Heinke Co.

[57] ABSTRACT

An apparatus for illuminating an object in a defined area. The apparatus comprises a light source for projecting a beam of light in a defined area. A mounting rotatably supports the light source to intermittently illuminate the object in the defined area with the beam of light at substantially equal intervals. A control establishes the frequency at which the beam of light intermittently illuminates the object in the defined area at a frequency of at least 12 cycles per second. A balance is adjustably connected to the mounting to provide dynamic balance of the mounting.

18 Claims, 7 Drawing Sheets

ILLUMINATION SYSTEM

This is a continuation-in-part of application Ser. No. 08/143,172, filed Oct. 26, 1993, now abandoned

BACKGROUND OF THE INVENTION

1. Technical Field

The present invention relates generally to illumination. In particular, the present invention relates to projecting a beam of light of various wavelengths in a defined area at a controlled frequency to intermittently illuminate an object in the defined area.

2. Description of the Art

Figure 1A:
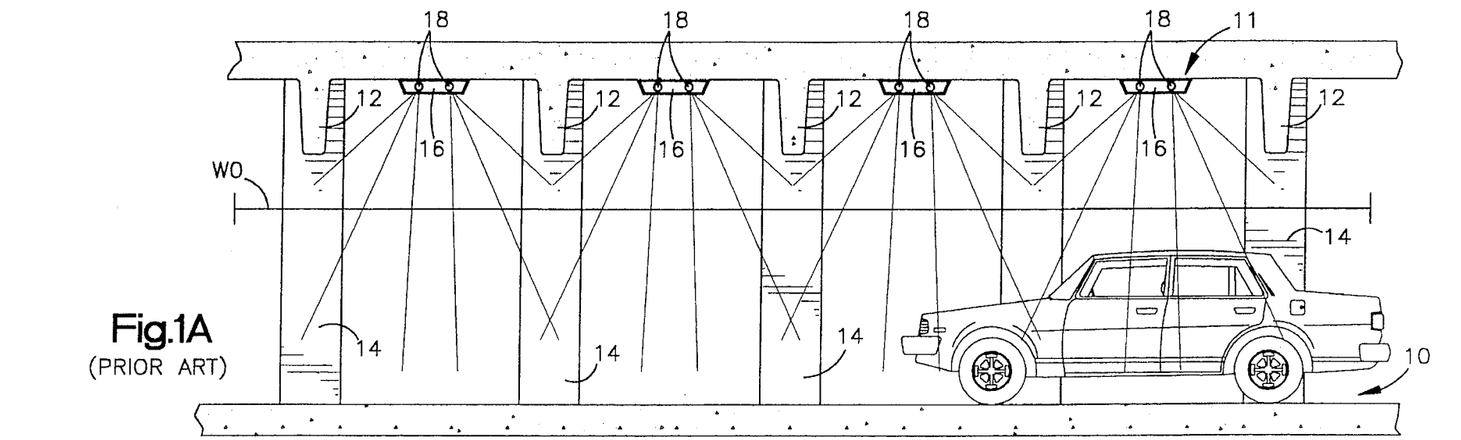
FIG. 1A is a cross-sectional view of one level of a parking deck structure having a prior art illumination system.

There are numerous known systems for lighting a relatively wide area. One such relatively wide area W0 is illustrated in FIG. 1A. The wide area W0 is relatively illustrated as a parking structure 10. In such a known wide area W0, when the parking structure 10 is located underground, or after dark, artificial illumination of the area is required. A known lighting system 11 is provided to light the wide area W0. Such a parking structure 10 often has numerous barriers such as beams 12 and columns 14 that inhibit or block light transmission. To provide substantially even lighting over the area W0, the known lighting system 11 typically includes a number of fixtures 16 located between the light inhibiting barriers 12, 14. Each fixture 16 typically includes a pair of fluorescent lamps 18.

Such an illumination system 11 suffers from a disadvantage because it is relatively costly to initially install and then operate and maintain a separate light fixture 16 between each light inhibiting barrier 12, 14 on each floor of the parking structure 10. The initial installation cost involves running wires and perhaps conduits to each of the many locations of each fixture 16 as well as the numerous fixtures and lamps 18 needed. It is relatively costly to maintain and operate the numerous fixtures 16 and lamps 18 used to illuminate such a relatively wide area W0 in a parking structure 10. This is particularly true when several levels of the parking structure 10 and ramps between the levels require illumination.

The cost of operating the known lighting system 11 is the cost associated with supplying electricity to each of the numerous lamps 18. The cost of maintaining the known illumination system 11 includes the cost of periodic replacement of the many lamps 18 located in many difficult to reach areas and the periodic cleaning of the numerous lamps 18, diffusers or reflectors, to remove dirt which blocks or absorbs light produced by each lamp and cuts down on the efficiency of the lamp.

It is known to rotate one or more incandescent lamps to illuminate wide areas. If rotation of these lamps is even slightly out of balance, a vibration can be generated that is transmitted to the lamp filament. The filament can break prematurely so the lamp requires replacing. Even if a particular rotating lamp is in balance, when it is replaced at some time, an out of balance condition can be encountered because lamps can weigh different amounts. Thus, a need exists for a way to easily balance a rotating lamp or lamps each time a lamp is initially placed, or replaced, in a socket or lamp holder.

SUMMARY OF THE PRESENT INVENTION

The present invention is directed to an apparatus and method for illuminating a relatively wide area from a single location. A relatively low cost of installation, maintenance and operation is realized with an illumination system embodying the present invention mainly due to the use of a light source at a single location. In addition to illuminating a wide area from a single location, the present invention may be used as a security System by operating in a manner such that people, vermin and insects are induced to flee from the defined area. The present invention also provides structure to easily balance a rotating lamp assembly each time a lamp, lightbulb or other source of light is operably attached to the assembly.

The apparatus of the present invention is for illuminating an object in a defined and relatively wide area. The apparatus comprises a light source for projecting a beam of visible light. Means is associated with the light source for intermittently illuminating an object in the defined area with the beam of light. A control establishes the frequency at which the beam of light intermittently illuminates the object in the defined area at a frequency of at least twelve cycles per second.

Thus, the invention in its broadest aspects comprises an apparatus for illuminating an object in a defined area. The apparatus includes a light source for projecting a beam of light in a defined area. Means associated with the light source is for intermittently illuminating an object in a defined area with the beam of light. A control establishes the frequency at which the beam of light intermittently illuminates the object in a defined area at a frequency of at least twelve cycles per second.

In one embodiment of the apparatus of the present invention, the light source comprises at least one light bulb that continuously projects a directional beam of light narrower than the defined area. The means associated with the light source comprises a mounting for rotatably supporting the lightbulb to intermittently illuminate the object in the defined wide area at substantially even intervals. Preferably, the light source includes multiple lightbulbs. The mounting supports the multiple lightbulbs at equally spaced locations around an axis about which the mounting rotates. The lightbulbs project respective beams of light in a direction substantially transversely away from the axis of rotation over the defined area at equally spaced directions 90° each from the next.

An important feature of the present invention is to provide structure to dynamically balance the rotating parts of the apparatus. The frequency of rotation of parts of the apparatus requires an adjustable device to obtain dynamic balance because over the life of the apparatus certain parts must be replaced and the new part will usually not have the same weight as the replaced part. The adjustable balance device is both simple in construction and readily accessible. Dynamic balance is important for proper operation of the apparatus and also for added life of the incandescent lamps of the apparatus.

Thus, the balance device of the present invention includes at least one weight that is adjustably movable in a radial direction relative to an axis of rotation of the apparatus. In one form of the invention, at least three and preferably four weights are equally spaced about the axis and movable radially. The weights are threaded onto or into rotatable support structure of the apparatus to effect radially movement for balance adjustment purposes.

In another embodiment of the apparatus of the present invention, the light source comprises a single lightbulb. The means associated with the light source comprises a mounting for rotatably supporting a reflector, prism or the like, to reflect the projected beam of light from the single lamp over the defined wide area. The reflector preferably comprises a suitable mirror. A control establishes the frequency at which the mirror is rotated to direct the beam of light about the defined area.

In an illumination mode of the present invention, the control establishes the frequency to be at least 50 cycles per second. This frequency enables a human optical system to perceive objects in the defined wide area as being continuously illuminated to a sufficient intensity level without causing discomfort to the human optical system. In a security mode of the present invention, the control establishes the frequency to be in the range of about 12 to 40 cycles per second which partly depends on an illumination differential of the projected light over the light already present in the defined area. A white light at a frequency of about 12 cycles per second has been shown to be very effective. This frequency interferes with normal operation of a recipient's optical system and causes discomfort to the recipient's optical system which is sufficient to induce the recipient to avoid or flee the defined area. The apparatus also includes means for varying the intensity of the light projected from the light source in order to obtain an effective illumination differential. In the security mode, longer wavelengths of visible light, i.e. red, are more effective than short wavelengths, i.e. violet. A combination of different wavelengths when multiple bulbs are used is even more effective to disrupt the optical system.

The present invention provides improved methods for illuminating a defined and relatively wide area. One method comprises the steps of providing a light source to project a directional beam of visible light over the defined wide area, the beam of light being narrower than the defined wide area; projecting and moving the beam of light to intermittently illuminate an object within the defined wide area at substantially evenly spaced time intervals; and controlling the frequency at which the beam of light illuminating any one portion of the defined wide area at a frequency of at least 12 cycles per second.

In an illumination mode, the above method includes controlling the frequency to give the perception to a human optical system that the defined area is continuously illuminated to a sufficient intensity level without causing discomfort to the human optical system. In the illumination mode the frequency of at least 50 cycles per second also provides adequate reflected light for areas not directly illuminated. In a security mode, the method includes controlling the frequency to be in a range which causes discomfort to a recipient's optical system. In the security mode the frequency is in the range of about 12 to 40 cycles per second. The method can further include the step of varying the intensity of the beam of visible light. For further use in the security mode, the wavelength of the light beam maybe varied.

Thus, the invention in its broadest aspects comprises a method of illuminating an object in a defined area. The method includes the steps of providing a light source for projecting a beam of light in a defined area. An object in the defined area is illuminated with the beam of light intermittently at substantially evenly spaced time intervals. The frequency at which the object is intermittently illuminated is controlled at a frequency of 12 cycles per second.

BRIEF DESCRIPTION OF THE DRAWINGS

Further features of the present invention will become apparent to those skilled in the art to which the present invention relates from reading the following specification with reference to the accompanying drawings, in which:

FIG. 6 is a longitudinal cross-sectional view of another embodiment of the apparatus of the present invention;

DESCRIPTION OF PREFERRED EMBODIMENTS

Figure 1B:
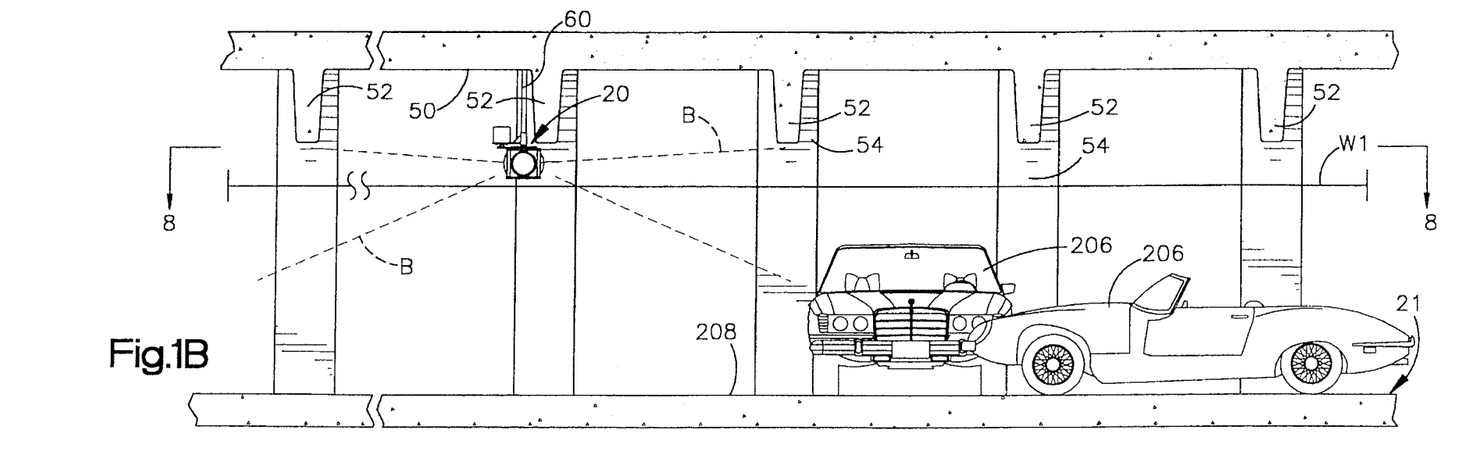
FIG. 1B is a cross-sectional view of one level of a parking deck structure having an illumination system embodying the present invention.
Figure 8:
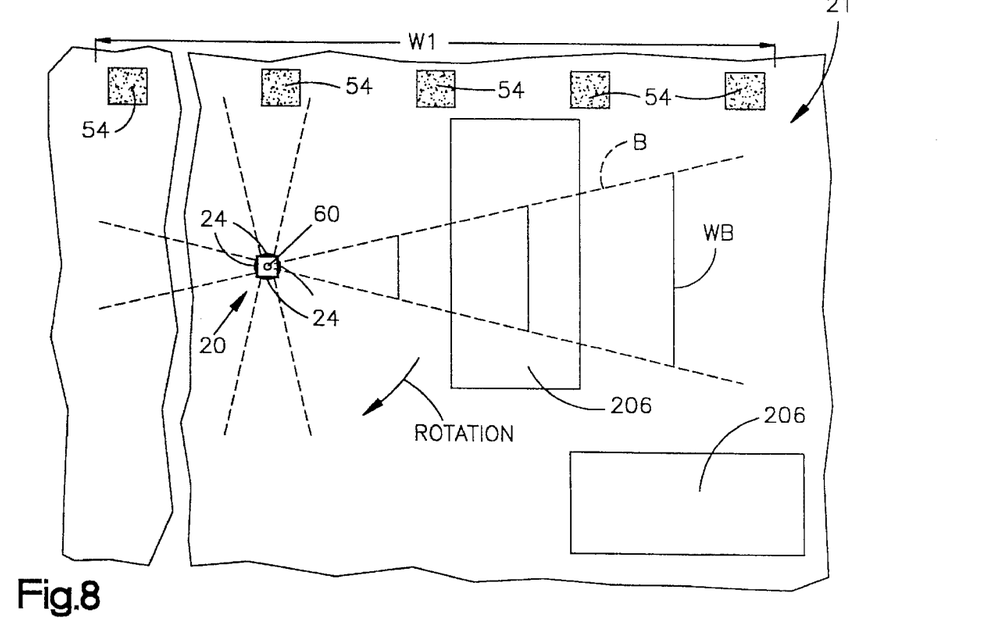
FIG. 8 is a plan view, partly in section, of the illumination system installed in a parking deck structure, taken along the line 8—8 in FIG. 1.

An illumination system 20, according to one embodiment of an apparatus of the present invention, is illustrated in FIGS. 1B and 8. The illumination system 20 is installed in a parking deck structure 21 to illuminate an object or objects in a defined and relatively wide area W1, such as an entire level of the parking deck or similar structure from one location. Only a single illumination system 20, embodying the apparatus of the present invention, is needed to illuminate an object in the defined area W1 of the entire level of the parking deck structure 21. The illumination system 20 provides significant installation, maintenance, and operating cost advantages compared to known prior art lighting systems, such as the known lighting system 11 illustrated in FIG. 1A.

Figure 4:
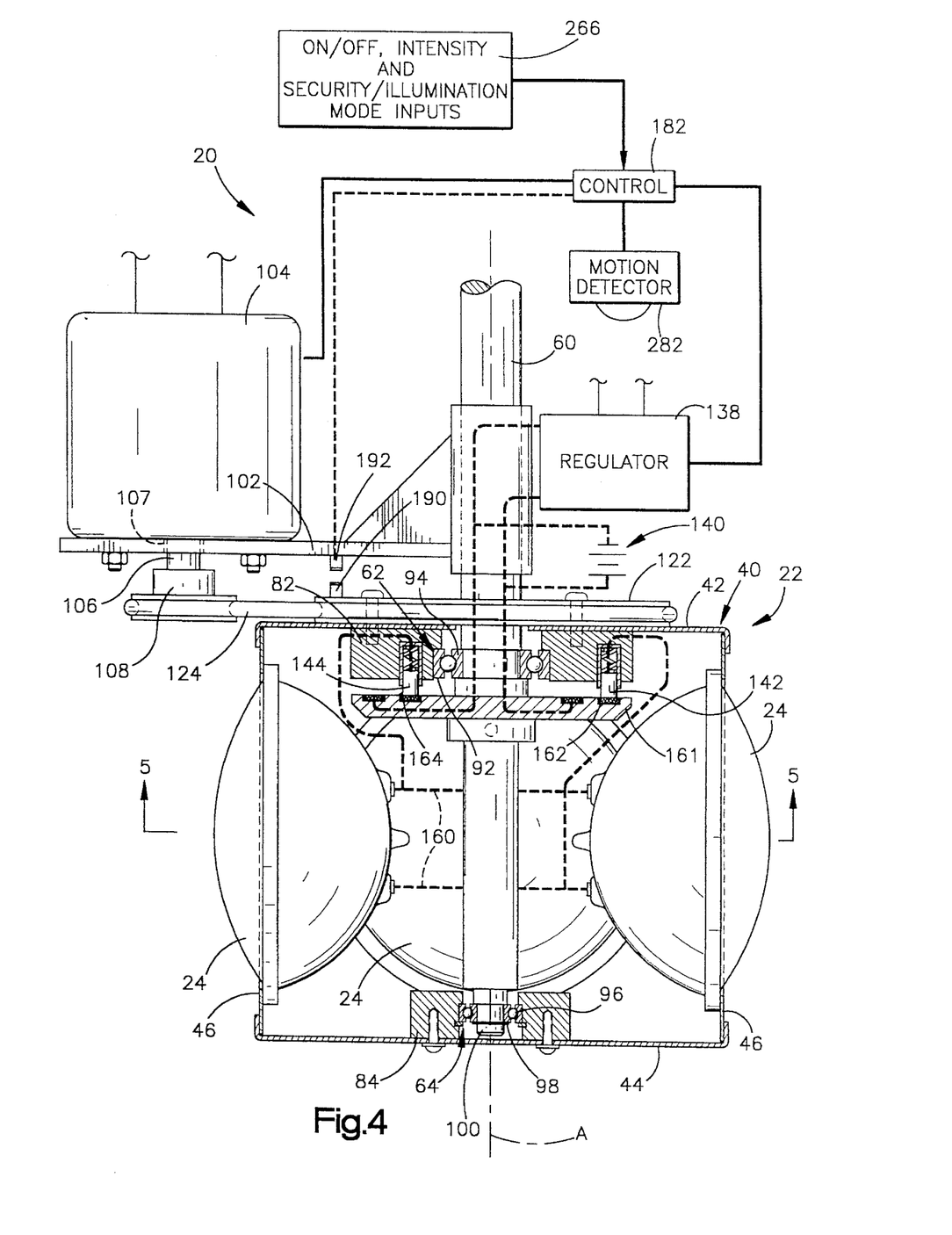
FIG. 4 is a longitudinal and partially cross-sectional schematic view of one embodiment of the apparatus of the present invention.
Figure 5:
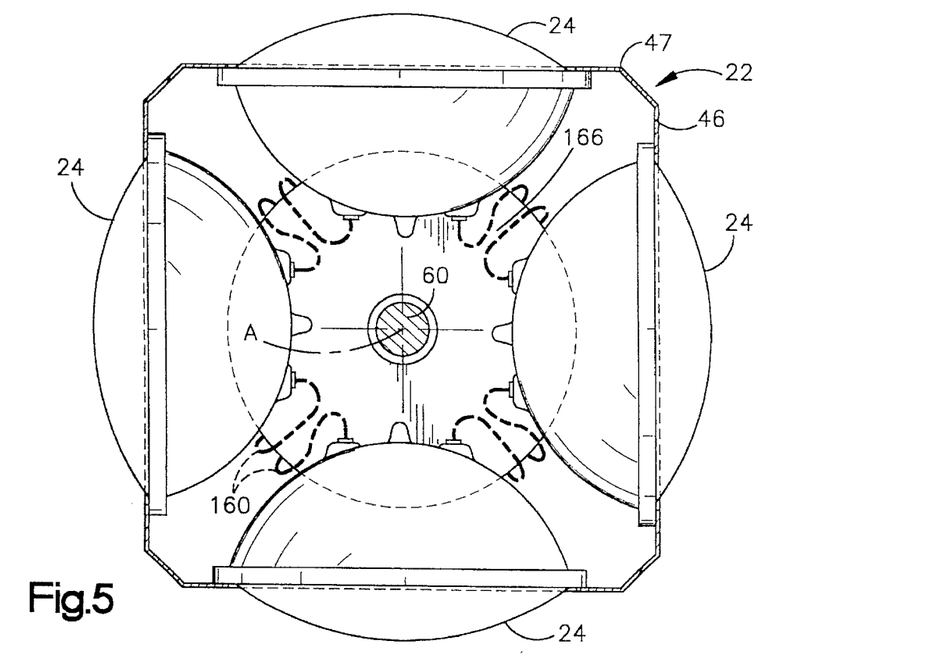
FIG. 5 is a cross-sectional view of a portion of the apparatus illustrated in FIG. 4, taken approximately along the line 5—5 in FIG. 4.

The apparatus of the illumination system 20 embodying the present invention is best seen in FIG. 4. The illumination system 20 includes a light fixture 22 which projects a directional beam B of visible light away from the light fixture, as illustrated in FIGS. 1B and 8. The projected beam B of visible light has a width WB (FIG. 8) which increases as the distance from light fixture increases but is always substantially narrower than the defined area W1. The light fixture 22 according to this embodiment preferably includes four electric powered lightbulbs 24 (FIG. 5). Each of the four lightbulbs 24 continuously projects a respective directional beam B (FIGS. 1B and 8) of visible light. Each of the lightbulbs 24 may be of any suitable lightbulb type. Each of the four lightbulbs 24 are preferably the same. Such a lightbulb 24 has a variable lightbulb intensity range depending on the power input to the lightbulb.

The four lightbulbs 24 are supported for rotation about an axis A in a mounting bracket 40 (FIG. 4). The four lightbulbs 24 are equally spaced 90° apart in an outwardly facing array about the axis A, as illustrated in FIG. 5. The mounting bracket 40 (FIG. 4) includes an upper plate 42, a lower plate 44 and a side plate 46. The side plate 46 may be in the form of four individual side plates, one for each side of the mounting bracket 40, or a single sheet of metal bent at each corner and having a single parting line 47, as illustrated in FIG. 5.

Each lightbulb 24 is adjustably and removably attached to the side plate 46 in a suitable manner, such as by fasteners. The side plate 46 has an opening through which a portion of a respective lamp 24 extends. The side plate 46 is attached to the upper plate 42 and to the lower plate 44 in a suitable manner. When the illumination system 20 is installed, for example in the parking deck structure 21, the illumination system may be surrounded by a protective shield (not shown) such as an unbreakable and transparent glass or plexiglass shield to prevent damage to the lamps 24 or other parts of the illumination system.

The mounting bracket 40 is fixedly attached to a component of the parking deck structure 21, such as a ceiling 50, a beam 52 or column 54 illustrated in FIG. 1B, by a shaft 60. The shaft 60 is fixed to the ceiling 50, beam 52, column 54 or more than one component, in a suitable manner, such as by fasteners, and preferably does not move, rotate or pivot relative to the component. The shaft 60 supports the mounting bracket 40 (FIG. 4) for rotation through an upper bearing 62 and a lower bearing 64.

The upper bearing 62 and lower bearing 64 are carried by the mounting bracket 40 in an upper block 82 and a lower block 84, respectively. The upper block 82 engages an outer race 92 of the upper bearing 62 and is attached to the upper plate 42. An inner race 94 of the upper bearing 62 is attached to a portion of the shaft 60 which is located inside the mounting bracket 40. The lower bearing 64 has an outer race 96 carried in the block 84 which is attached to the lower plate 44. An inner race 98 of the lower bearing 64 is mounted on an axial end portion 100 of the shaft 60 which is also located inside of the mounting bracket 40.

A motor mount 102 is also fixedly attached to the shaft 60. The motor mount 102 is attached to the shaft 60 by suitable means. The motor mount 102 supports an electric motor 104 which is electrically connected to power. The motor 104 is a variable speed type of electric motor. The motor 104 has a shaft 106 extending through an opening 107 in the motor mount 102. A pulley 108 is attached to an axial end portion of the shaft 106 extending below the motor mount 102, as viewed in FIG. 4.

Another pulley 122 is fixed to the upper plate 42 of the mounting bracket 40. A flexible drive connection 124, such as an elastomeric belt, is routed over the pulley 108 and the pulley 122. During actuation of the motor 104, the shaft 106 and pulley 108 rotate. Force of the rotating pulley 108 is transferred to the drive belt 124 to rotate the pulley 122, the entire bracket 40 and lightbulbs 24 about the axis A. Other suitable structures to provide for rotation of fixture 22 may be used.

Power to illuminate the lightbulbs 24 to project the respective beams B of visible light is conducted to the rotatable mounting bracket 40 from a regulator 138. The regulator 138 is controlled to vary the intensity of the beams B of light projected from the lightbulbs 24. A battery backup 140 may be included to provide power to the lightbulbs 24 during a disruption of electrical service. The battery backup 140, thus, assures that the lightbulbs 24 provide some light in an enclosed and otherwise dark defined area W1.

The power from the regulator 138 or the batteries 140 is conducted to the lightbulbs 24 through a brush and ring arrangement. A pair of brushes 142 and 144 are carried by the upper block 82 and are electrically connected with each of the lamps 24 through wires 160. Continuous annular conductive rings 162 and 164 are attached to power and are carried in a ring support 161. The ring support 161 is fixed to the shaft 60. The rings 162, 164 are contacted by a respective brush 142, 144 which rotate with the mounting bracket 40 and upper block 82 to conduct power to the wires 160 and to the lightbulbs 24. Thus, the brushes 142, 144 and the rings 162, 164 connect the lightbulbs 24 with electrical power during rotation of the mounting bracket 40.

Figure 4A:
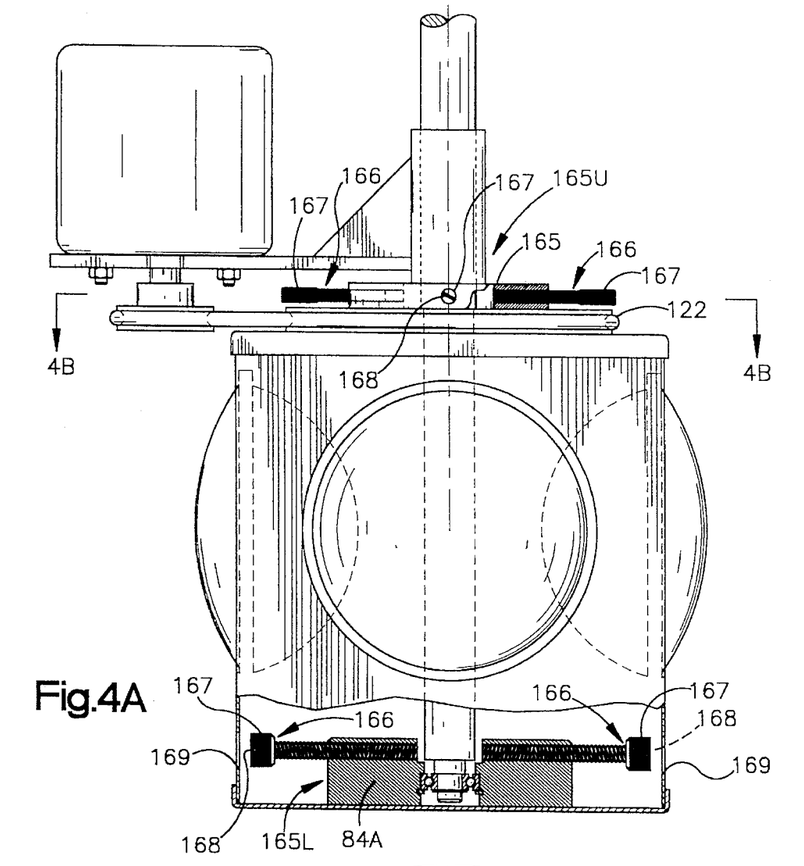
FIG. 4A is a view similar to FIG. 4 of the apparatus of an alternate embodiment of the present invention including adjustable balancing structure.
Figure 4B:
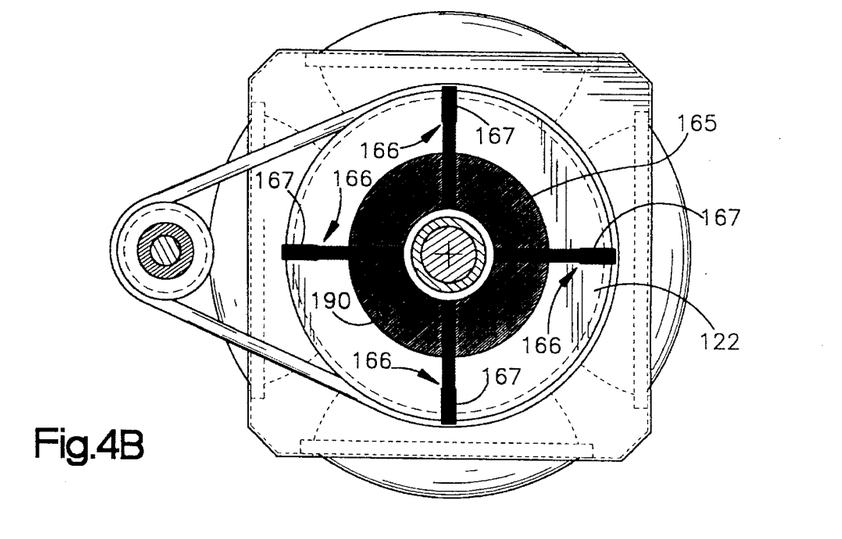
FIG. 4B is a plan view of the modification shown in FIG. 4A, taken approximately along line 4B—4B of FIG. 4A.

FIG. 4A shows an optional but preferred modification to the illumination system 20 in the form of an upper balance adjuster 165U. A circular boss 165 is fixed on the upper side of pulley 122. The boss 165 has sufficient thickness to receive two or more radially adjustable screw members 166 in openings in the boss 165. An outer end 167 of the screw member 166 has significant mass to balance rotation of the bracket 40. The outer end 167 of each weight is enlarged to provide a knurled, cylindrical surface for hand adjustment or may have a notch 168 for adjustment by a tool, such as a screwdriver. Upon radial movement of any or all screw members 166 relative to the axis A, a change in the location of the center of gravity of the rotating mass of the bracket 40 occurs to align as closely as possible with the axis A. Adjustment of the screw members 166 can, thus, correct an out of balance condition of the bracket 40. FIG. 4B shows four equally spaced and radially adjustable screw members 166 threaded into the boss 165.

FIG. 4A also shows another arrangement to obtain dynamic balance of the rotating parts of the mounting bracket 40 by means of a lower balance adjuster 165L. Lower block 84A has been enlarged from the size of block 84 (FIG. 4) to receive two or more screw member 166. Access openings 169 are made in the side plate 46 to provide access for a screwdriver radial adjustment of screw members 166 in the enlarged lower block 84A. While dynamic balance of the rotating parts of the apparatus is possible with the arrangement of just the upper balance adjuster 165U or lower balance adjuster 165L shown in FIG. 4A, a more satisfactory arrangement is possible by using both the upper and lower balance adjusters 165U, 165L shown in both FIG. 4A together.

When the illumination system 20 is installed in the parking deck structure 21, it is desirable to rotate the mounting bracket 40 at a relatively constant speed so the frequency at which an object is intermittently illuminated at least at 12 cycles per second. Preferably, in an illumination mode, the lightbulbs 24 project the respective beams B of visible light over any one portion or object in the defined area W1 at a frequency which is at least 50 cycles per second. For example, if it is determined that the frequency is to be 60 cycles per second at substantially equal time intervals, proper rotation of the mounting bracket 40 can be established. Since there are four lightbulbs 24 that project a separate beam B of light per rotation, the mounting bracket 40 is rotated at 15 revolutions per second. This frequency of 60 cycles per second of projected light intermittently illuminating the object in the defined area W1, at a suitable intensity level, is perceived by a normal human optical system that the object is constantly illuminated at a sufficient level.

The object is perceived as continually illuminated at a sufficient intensity to permit normal activity in the defined wide area W1. Since a human optical system, when functioning unimpaired, acts to "remember" a snapshot of the actual illumination of the object in the defined wide area W1. This memory of the snapshot lasts for a given duration beyond the time when the beam B of light no longer directly illuminates the object. When the frequency at which the object is illuminated provides an interval between illuminations which is shorter than the time it takes for the human optical system to lose the memory of the snapshot of the illumination, the object appears to be continually illuminated.

Figure 7:
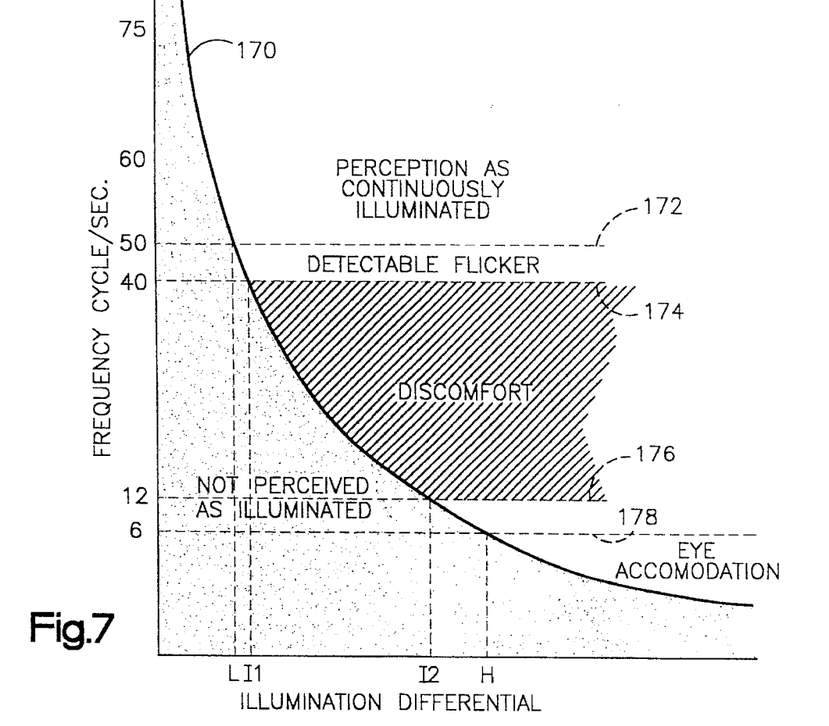
FIG. 7 is a graph illustrating the effect on a human optical system as a function of the frequency and the illuminating differential of light intermittently illuminating an object.

By way of example, as illustrated in the graph in FIG. 7 by a stimulus threshold curve 170, at a frequency of 50 cycles per second or more even at a relatively low illumination differential L, the human optical system perceives the object in the defined area W1 to be constantly illuminated to a sufficient level. Such an illuminated frequency and differential generally does not cause discomfort to the human optical system and enables a person to function, such as to insert a key into a lock of a car in the parking deck structure 21 illustrated in FIG. 1B or to avoid contacting other objects in the defined area.

The optical systems of other living beings also have a snapshot memory of what stimulated the optical system for a period of time which is longer than the time interval between intermittent illuminations of the object in the defined area W1. Once the optical system of a living being is exposed to intermittent illumination of the object in the defined area W1 at a rate of in the range of about 12 to 40 cycles per second, discomfort and pain often result to the recipient's optical system. This pain and discomfort is sufficient to cause the recipient, such as vermin, a human intruder or even insects to flee the defined area W1 in order to avoid such pain and discomfort.

As illustrated in FIG. 7, it is believed that the majority of optical systems react according to the minimum stimulus threshold curve 170. While the curve 170 is believed to be representative for the reaction of a normal human optical system, it is understood that the curve will have a different shape and location relative to the axes for different people, each biological specimen, age, physical condition, light spectrum and for different individual reactions of an eye's pupil, rods and cones. It is also believed that intensity contrast or differential is important. Intensity differential is the difference between the intensity of existing light in the defined area W1 and the intensity of the light projected from the illumination system 20. The projected light must have a relatively greater intensity than the light existing in the defined area W1. For example, at night a human optical system may require relatively less intensity differential than during the day to perceive the same illumination level. Thus, a "night curve" would be shifted to the left in FIG. 7 from the illustrated position of curve 170.

At relatively low light intensity differentials from about a frequency in the range of 50 cycles per second to 100 cycles per second or more of intermittent illumination of an object, that object will appear to be continuously illuminated because of the snapshot memory phenomena associated with the human optical system. The minimum stimulus threshold range of an "average" person at which constant and sufficient illumination is represented by the area above line 172 and to the right of curve 170. Anything to the left of the curve 170 and above line 172 generally is not perceived by this average person as being illuminated.

In a frequency range of about 40 to 50 cycles per second and at which the intensity differential is required to be at a somewhat relatively higher level I1 than the low intensity differential L, the intermittent illumination of the object in the defined area W1 becomes detectable as a visible flicker. Below line 174 at 40 cycles per second and at relatively higher light intensity differential than level I1, the flicker becomes objectionable and disruptive to the human optical system. The objectionable flicker causes discomfort, up to and including unbearable pain to the human optical system, which may induce the person to avoid or flee the defined area W1 because of the discomfort. The discomfort continues until a relatively slow frequency of about 12 cycles per second below line 176 and to the right of curve 170 is reached. To the left of curve 170 between lines 174 and 176, little or no discomfort is felt.

Additionally, it has been found that projecting beams B of visible light with a relatively long wavelength, such as 6500 angstroms or longer, defining the red color spectrum is more effective in causing discomfort to the optical system than a relatively short wavelength, such as 4500 angstroms or less defining the violet color spectrum. It is believed that by using lightbulbs 24 in the illumination system 20 which project beams B of visible light having different wavelengths causes even more discomfort to the optical system than if the same wavelength were projected from each lightbulb in the security mode. For example, one lightbulb 24 projects a beam B of visible light with a wavelength in the range of 6000 angstroms to 7000 angstroms and another lightbulb projects a beam of visible light with a wavelength in the range of 4000 angstroms to 5000 angstroms at an intermittent illumination frequency of 20 cycles per second.

Thus, in the range of 12 to 40 cycles per second, the illumination system 20 of the present invention may be used as a security system to drive away unwanted human occupants from the defined wide area W1. It has also been found that there is an objectionable frequency range for other living beings, such as, animals, vermin, rodents, including mice and rats and some insects, The animals can suffer permanent damage to their optical systems by prolonged exposure to such objectionable lighting and illumination conditions and are believed to find the flicker even more objectionable than humans. The objectionable frequency range for animals may or may not correspond to the 12 to 40 cycles per second range that is objectionable to humans.

Once the frequency drops below 6 cycles per second, the human optical system, and it is believed animal optical systems, will adapt and accommodate to the lower illumination frequency regardless of intensity levels of illumination. For example, emergency vehicle flashing lights, because of rotation of the light source, operates well below this maximum eye accommodation frequency, such as in the range of about one to three cycles per second. This is anywhere below the line 178 and to the right of curve 170 at a relatively high intensity differential H in FIG. 7. Anything to the left of curve 170 is not perceived as illuminated.

A control 182 (FIG. 4) may optionally be provided to establish and maintain the frequency at which the light fixture 22 projects the beam B of visible light to intermittently illuminate the object in the defined area W1. The control 182, as a function of desired inputs and parameters, will control the speed of rotation of the motor 104 to correspond to a desired frequency at which the object in the defined area W1 is intermittently illuminated with the beam of light. The inputs and parameters are used by the control 182 to determine or establish whether the illumination system 20 is to operate in an illumination mode or in a security mode. The control 182 preferably includes a microprocessor and a program to determine the operation of the illumination system 20. Preferably, an emitter 190 (FIGS. 4, 4A and 4B) is fixed to the mounting bracket 40 for rotation therewith. A sensor 192 is fixed to the motor mount 102 so the emitter 190 passes nearby the sensor. The sensor 192 monitors the speed of rotation of the mounting bracket 40. The sensor 192 is operably connected to the control 182 to provide a feedback signal to the control to assure that the mounting bracket 40 is operating at a desired rotational speed, and hence, frequency of intermittent illumination of the object in the defined area.

By way of example, when the illumination system 20 is used in the parking deck structure 21, as illustrated in FIG. 1B, only one illumination system 20 is required to replace the multiple fixtures 16 of the prior art illumination system 11 as illustrated in FIG. 1A. The illumination system 20 is located substantially central in the defined area W1. The lightbulbs 24 are preferably supported at a location below the beams 52 in order to provide the most direct and uninterrupted path for illuminating objects in the entire defined area W1.

The illumination system 20 is controlled to operate in an illumination mode at a frequency so that any object such as a ceiling 50, beam 52, column 54, autos 206 and floor 208 are illuminated to a sufficient intensity level. The intensity level is such that the object is perceived by a human optical system as continuously illuminated at a sufficiently high intensity level without causing pain, discomfort or damage to a human optical system. Preferably, the frequency at which each object in the defined area W1 has the beam B of visible light intermittently illuminating it is at least 50 cycles per second.

Figure 2:
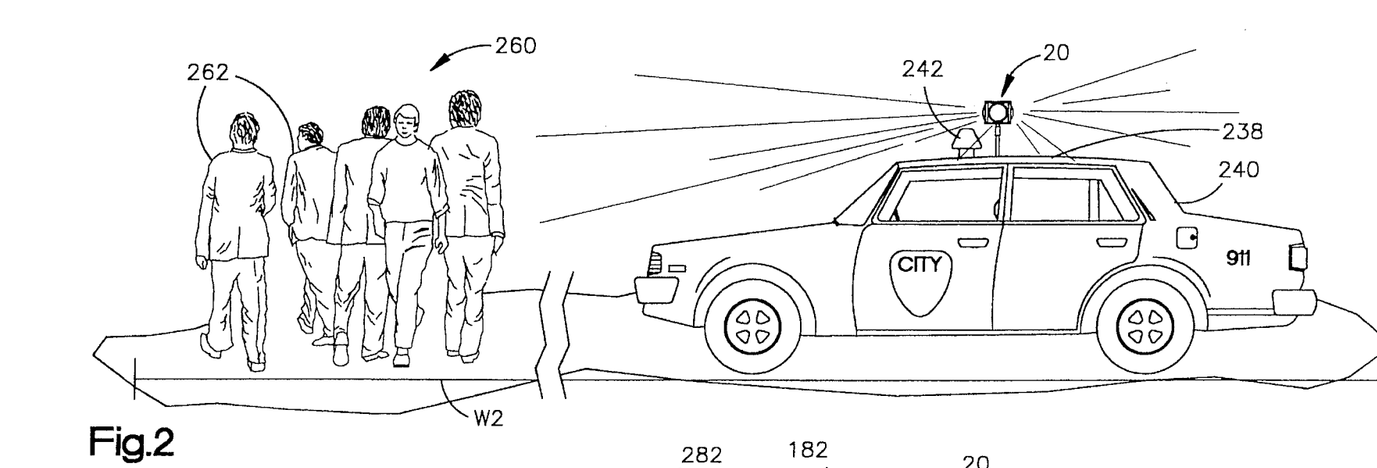
FIG. 2 is a view of the illumination system embodying the present invention installed on a vehicle.

By way of another example, the illumination system 20 is illustrated in FIG. 2 operably connected to the roof 238 of an emergency vehicle 240, such as a police or fire vehicle, that is movable to locations in need of light. The emergency vehicle 240 includes a standard emergency flasher system 242 that typically has a visible and directed red, blue or white light source. This flasher system 242 typically operates to rotate a light source at about one to three revolutions per second. The illumination system 20 of the present invention may be separate from the emergency flasher system 242 or may be integrally incorporated into the emergency flasher system.

The illumination system 20 mounted to the emergency vehicle 240 may be used in numerous ways. One way is to use the illumination system to illuminate an object in a defined area W2 at a frequency of at least 50 cycles per second in order to illuminate the object in the defined area to a sufficient intensity level that it appears constantly illuminated. The use of the illumination system 20 mounted on the emergency vehicle 240 may be required when, for example, a traffic accident occurs at night, or something is being searched for at night, or in an enclosed area that is not illuminated to a sufficient level of intensity.

Another way in which the illumination system 20 attached to an emergency vehicle 240 may be used is for management of a crowd 260 and/or control of the behavior of a person 262. When the illumination system 20 is operated at a frequency in the range of 12 to 40 cycles per second at a sufficient level of differential intensity, the illumination system serves to disperse persons 262 in a crowd 260 or disrupt a person's undesirable behavior. This crowd or behavior management results from the discomfort and pain caused to a human optical system. Such discomfort and the pain will induce a person to flee or to avoid the area that is illuminated by the illumination system 20 or at least cause a person to temporarily cease the undesired behavior.

The frequency at which the illumination system 20 mounted on an emergency vehicle 240, illustrated in FIG. 2, projects the beam B of visible light can be controlled by a control 182 (FIG. 4) mounted inside the vehicle. The control 182 may be connected with an input device 266, such as a switch that would turn the illumination system 20 on and in response to operator input and another switch to establish whether the illumination system will be operated in an illumination mode or a security mode. The input device 266 may also be another switch that is used to establish the intensity of the beam B of visible light projected from the lamps 24.

By way of another example, the illumination system 20 could also serve as a stationary lighting system or as an intruder deterrence security system in a room of a building or home. For example, the defined wide area W3, illustrated in FIG. 3, has the illumination system 20 installed and includes a control 182 and a motion detector 282 to detect the presence of an intruder.

Figure 3:
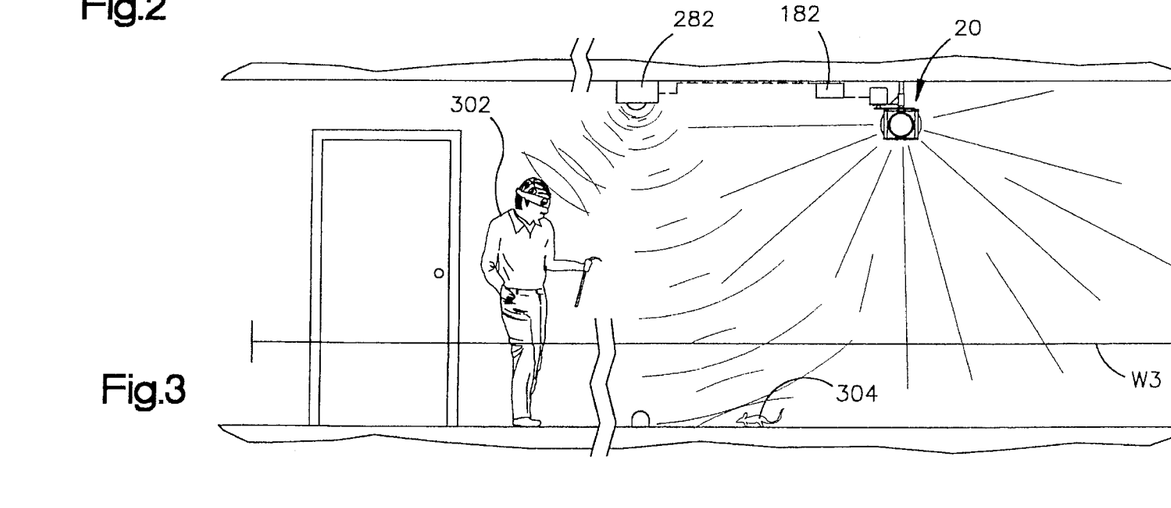
FIG. 3 is a view of the illumination system embodying the present invention installed in a room of a building.

The living being intruder may be a human 302 or vermin, such as a rodent 304. In either case, the presence of the intruder 302, 304 is detectable by the motion detector 282. The motion detector 282 then communicates an electric signal to the control 182 indicative of such presence. The control 182 then turns on the illumination system 20 if it was off and determines the frequency at which the illumination system 20 is to project a beam B of visible light. If the illumination system 20 is used, for example, in a seldom used storage room and the input device 266 is set to illumination mode, the light source 22 can be controlled to have the lamps 24 on and rotating at 15 revolutions per second, for an intermittent illumination frequency of 60 cycles per second, only when a person 302 is present.

If the illumination system 20 is used in a home or office and the input device 266 is set to the security mode, the lamps 24 are turned on and rotated at a speed of 3 to 10 revolutions per second, for an intermittent illumination frequency of 12 to 40 cycles per second, when a person 302 or animal 304 is present. The security mode operation is similar to the crowd management mode described above which causes discomfort to the optical system of the intruder. The security mode frequency is in the range of 12 to 40 cycles per second at a suitable intensity for the defined wide area W3 and induces the intruder to flee from the area.

Such an illumination system 20 operated in the security mode could be used in private residences or in commercial buildings. In either case, an authorized owner or occupant of the defined wide area W3 could override the motion detector 282 signal to the control 182 by use of a disarming personal identification code within a predetermined time after detection. Such a code could be entered through the input device 266 by means of a keypad or a magnetic card reader and communicated to the control 182 to prevent the illumination system 20 from switching into the security mode. Thus, only an undesired intruder would be subjected to an objectionable frequency of the illumination system 20 which would cause discomfort and possibly pain to the recipient. The authorized owner or occupant of the defined area W3 would, thus, only be subject to light at a frequency of at least 50 cycles per second which would illuminate an object in the defined area.

An alternate embodiment of another apparatus of an illumination system 340 is illustrated in FIG. 6. The illumination system 340 includes a single stationary lamp 342 for continuously projecting a beam B of visible light downwardly, as viewed in FIG. 6. A reflector 344 is positioned within the beam B of visible light. The reflector 344 may be a mirror, prism or the like, and reflects the downwardly directed beam B of visible light transversely to the direction of axis R which is located at the center of the beam B to become a reflected beam RB of light.

The reflector 344 preferably comprises a planar mirror which has an elliptical shape when viewed in a direction N normal to the planar mirror. The planar surface of the reflector 344 is preferably located at an angle N relative to the direction R in which the beam B is projected. The angle N preferably is 45°. Thus, the reflected beam RB of light extends in a direction substantially perpendicular to the direction R in which the beam B of light was projected from the lamp 342.

The reflector 344 is supported for rotation about the axis R by a mounting bracket 362. The mounting bracket 362 is carried on a shaft 366 of a motor 364. Upon actuation, the motor 364, rotates the reflector 344 about the axis R in order to intermittently reflect light from the lamp 342 over any one portion of a defined wide area.

The illumination system 340 includes a mounting bracket 370. The mounting bracket 370 supports the lamp 342 and motor 364 and is attachable to a structure 372, such as a ceiling. The mounting bracket 370 includes a bottom plate 380, atop plate 382 and four side plates 384.

The motor 364 is fixed to the bottom plate 380. The top plate 382 attaches the illumination system 340 in a suitable manner to the structure 372. The side plates 384 are connected between the bottom plate 380 and the top plate 382. The top plate 382 carries a lamp socket 386 for the lamp 342. The lamp socket 386 is connected with electrical power by wires 388. The side plates 384 hold the motor 364 and reflector 344 in a desired spaced relationship from the lamp 342. The side plates 384 have openings 390 which permit the reflected beam RB of light to be directed outwardly of the illumination system 340. These openings 390 may be optionally provided with security covers, such as unbreakable and transparent glass or plexiglass which permit light to be reflected through but prevents damage to the lamp 342, reflector 344 or drive.

The motor 364 rotates the reflector 344 to continuously reflect the beam RB of light over the defined area at a speed established by a control (not shown) but which operates in a manner similar to the control 182 described above and illustrated in FIG. 4. The speed established by the control is determined to operate the illumination system 340 between a security mode and an illumination mode, as described above for the illumination system 20. The speed of rotation of the reflector 344, which is the frequency at which an object in the defined area is intermittently illuminated, is at least 12 cycles per second. For various areas, it is possible to vary the angle the reflector 344 is mounted on shaft 366 and also, if desired, to have a convex surface on reflector 344.

Figure 6A:
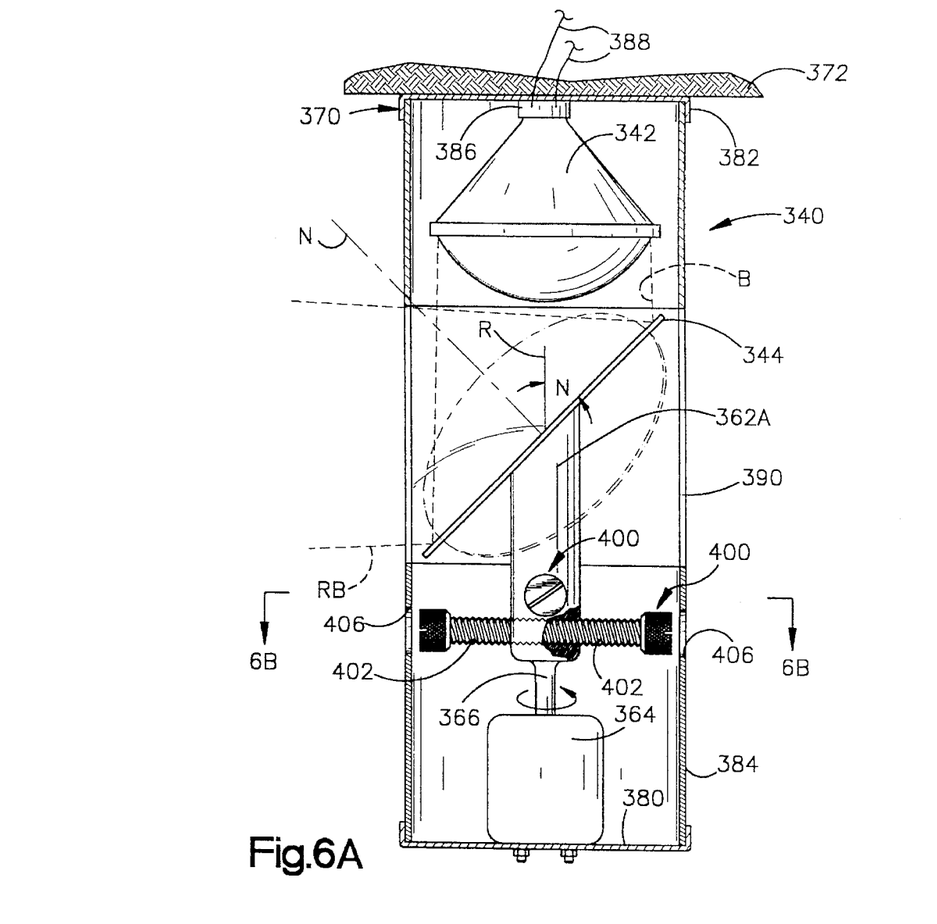
FIG. 6A is a view similar to FIG. 6 of an alternate embodiment of the apparatus of FIG. 6 including adjustable balance structure.
Figure 6B:
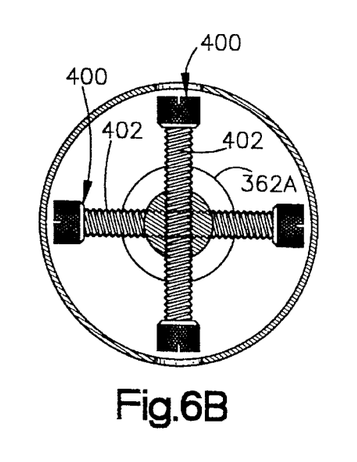
FIG. 6B is a plan view of the adjustable balancing structure of FIG. 6A taken approximately along line 6B—6B of FIG. 6A.
Figure 6C:
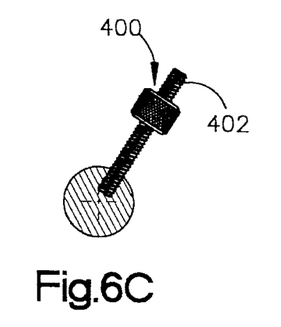
FIG. 6C is a view similar to FIG. 6B illustrating another embodiment of the invention.

FIGS. 6A and 6B show the reflector 344 on a mounting bracket 362A which can be longer than mounting bracket 362 of FIG. 6. Each tapped hole in the mounting bracket 362A receives a respective radially extending threaded weight 400 to be adjustably mounted on the bracket to provide for dynamically balancing the rotating parts. A threaded shaft 402 of the weights 400 may be adjusted within the mounting bracket 362A through openings 406 as shown in FIG. 6A or the threaded shaft may be fixed in bracket 362A and the weights adjusted radially on the shafts as alternately shown in FIG. 6C.

In operation, the method embodying the present invention may use either apparatus of an illumination system 20 or 340. The method is for illuminating an object in a defined area. The method includes providing a light source, such as the light source 22 (FIG. 4). The light source includes at least one electric lightbulb which continuously projects a respective directional beam B of light over a defined area. The beam B of visible light is narrower than the defined area. The method also includes projecting the beam B of visible light over the defined area. The beam B of visible light intermittently illuminates an object in the defined area at substantially evenly spaced time intervals.

The method also includes controlling the frequency at which the beam B of visible light is intermittently illuminates the object in the defined area. The frequency at which the beam B of visible light intermittently illuminates the object is at a frequency of at least 12 cycles per second. The frequency would be at least 50 cycles per second when the illumination system 20 or 340 is in an illumination mode, or in the range of about 12 to 40 cycles per second, when in a security mode. The method may include the step of providing a light source having at least one lightbulb supported for rotation. Alternately, the method could include a lightbulb 342 (FIG. 5) that is fixed and a reflector 344 which reflects a beam RB of visible light in a direction transversely to the direction in which the beam of light was originally projected.

Figure 5A:
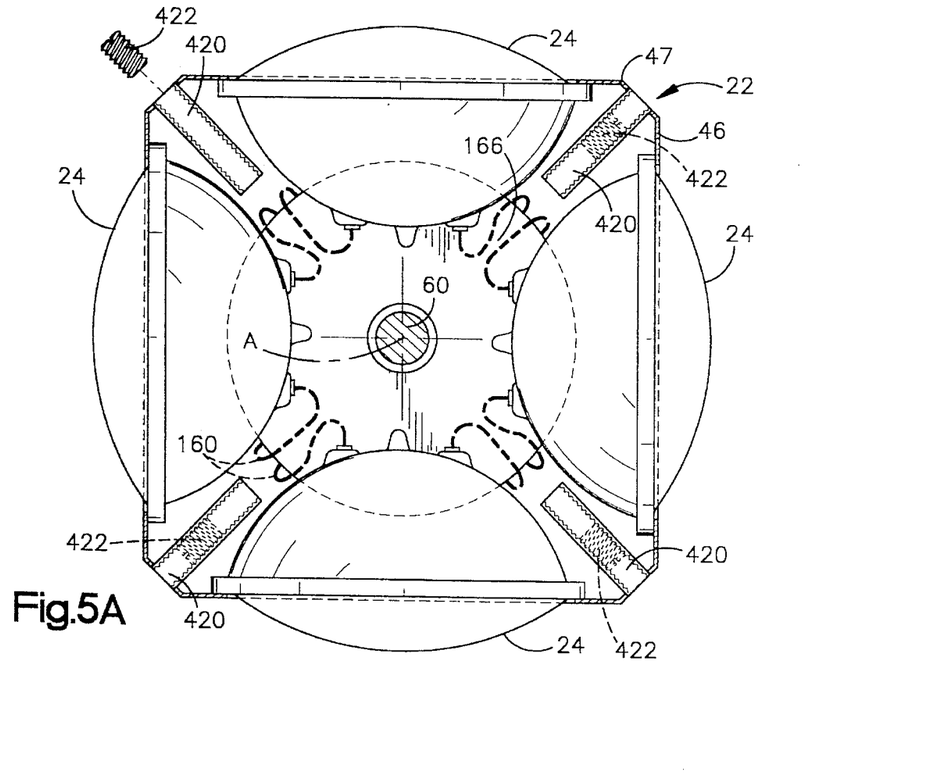
FIG. 5A is a view similar to FIG. 5 of the apparatus with adjustable balancing structure.

FIG. 5A shows a modification to the side plate 46 of FIG. 5 to provide for a threaded tube 420 to be mounted on two or more corner portions of the side plate. Weights 422 are adjustably threaded radially inward or outward of the tubes 420 by a screwdriver to obtain a dynamic balance of the rotating parts of the apparatus.

While the above description is of a rotational means to provide intermittent light exposure, similar results may be obtained by using well known oscillating or flashing strobe-type means.

From the above description of preferred embodiments of the invention those skilled in the art will perceive improvements, changes and modifications. Such improvements, changes and modifications within the skill of the art are intended to be covered by the appended claims.

Having described preferred embodiments of the invention, what is claimed is:

1. An apparatus for illuminating an object in a defined area, said apparatus comprising:

a light source for projecting a beam of light in a defined area;

a mounting for supporting said light source for rotation about an axis to intermittently illuminate the object in the defined area with the beam of light at substantially equal time intervals;

a control to establish the frequency at which the beam of light intermittently illuminates the object in the defined area at a frequency of at least 12 times per second; and a balance connected to said mounting to provide adjustable balance of rotating parts of said mounting, said balance including a first mass adjustably locatable in a radial direction relative to the axis of rotation.

2. The apparatus set forth in claim 1 wherein the mounting includes two ends which are axially spaced and wherein said balance further includes a second mass adjustably locatable in a radial direction relative to the axis of rotation said first mass connected to said mounting near a first end of said mounting and said second mass connected to said mounting near a second end of said mounting.

3. The apparatus set forth in claim 1 wherein said balance includes a threaded member which adjustably engages a threaded aperture in the mounting and wherein the first mass is fixed on the threaded member for radial movement with said threaded member during rotation of said threaded member.

4. The apparatus set forth in claim 1 wherein said first mass threadedly engages a threaded support member and is movable relative to the support member upon rotation of said first mass.

5. The apparatus set forth in claim 1 wherein said light source comprises at least one lightbulb for continuously projecting a directional beam of light and which beam of visible light is narrower than the defined area.

6. The apparatus set forth in claim 5 wherein said light source includes a pair of lightbulbs, one of the lightbulbs projects a first beam of visible light of a first wavelength, the other of the lightbulbs projects a second beam of visible light of a second wavelength different than the first wavelength.

7. The apparatus set forth in claim 1 wherein said control establishes the frequency at which the beam of light intermittently illuminates the object in the defined area at a frequency of at least 50 times per second.

8. The apparatus set forth in claim 1 wherein said control establishes the frequency at which the beam of light intermittently illuminates the object in the defined area at a frequency which enables a human optical system to perceive the object as being continuously illuminated at a sufficient level without causing discomfort to the human optical system.

9. The apparatus set forth in claim 1 wherein said control establishes the frequency at which the beam of light intermittently illuminates the object in the defined area at a frequency in a range of about 12 to 40 times per second.

10. The apparatus set forth in claim 1 wherein said control establishes the frequency at which the beam of light intermittently illuminates the object in the defined area at a frequency which interferes with normal operation of a recipient's optical system and causes discomfort to the recipient's optical system.

11. The apparatus set forth in claim 1 wherein said light source projects a visible beam of light having a wavelength of at least 6500 angstroms.

12. The apparatus set forth in claim 1 further including a sensor in communication with said control, said sensor for detecting a presence of a living being in the defined area and for communicating a signal to said control indicative of a presence of a living being, said control selecting a frequency at which the beam of light intermittently illuminates the object in response to receiving the signal and as a function of an authorization status of a living being, the selected frequency being a selected one of a security mode frequency and an illumination mode frequency.

13. The apparatus set forth in claim 1 further including means for varying the intensity of the beam of light projected from said light source.

14. An apparatus for illuminating an object in a defined area, said apparatus comprising:

a light for continuously projecting a directional beam of visible light narrower than the defined area;

a support for rotatably mounting said light about an axis of rotation, the support including two axially spaced ends;

a drive to rotate said support at a substantially constant speed for intermittently illuminating an object in the defined area at substantially even intervals;

a control to establish a rotational speed of the support by which said light intermittently illuminates the object in the defined area at a frequency of at least 12 times per second; and a first balance adjuster and a second balance adjuster connected to said support for balancing the support during rotation, said first balance adjuster connected to the support near a first end of the support and said second balance adjuster connected to the support near an end of the support opposite the first end of the support.

15. The apparatus set forth in claim 14 wherein at least one of said first balance adjuster and said second balance adjuster comprises a mass adjustably locatable in a radial direction relative to the axis of rotation.

16. The apparatus set forth in claim 15 wherein at least one of the first balance adjuster and the second balance adjuster includes a threaded member that adjustably engages a threaded aperture in the support and wherein said mass is fixed on the threaded member for radial movement with said threaded member during rotation of said threaded member.

17. The apparatus set forth in claim 15 wherein said mass threadedly engages a threaded support member and is movable relative to the support member upon rotation of said mass.

18. Apparatus for illuminating an object in a defined area, said apparatus comprising:

a light beam source, rotating means for projecting a beam of light from the source in a circular path, said means including a mounting supported for rotation about a relatively fixed support, the mounting including axially spaced ends, a balance connected to said mounting to provide adjustable balance to said rotating means, the balance including a first weight radially moveable relative to the fixed support and a second weight radially movable relative to the fixed support, the first weight connected to the mounting near one end of the mounting and the second weight connected to the mounting near an end of the mounting opposite the one end of the mounting, and a control to establish the frequency at which the projected beam illuminates an object.

* * * * *